United States Patent [19]

Chae

[11] Patent Number: 5,760,693
[45] Date of Patent: Jun. 2, 1998

[54] VACUUM APPARATUS FOR SEMICONDUCTOR DEVICE

[75] Inventor: Hee-sun Chae, Suwon, Rep. of Korea

[73] Assignee: Samsung Electronics Co., Ltd., Suwon, Rep. of Korea

[21] Appl. No.: 640,403

[22] Filed: Apr. 30, 1996

[30] Foreign Application Priority Data

Sep. 25, 1995 [KR] Rep. of Korea .................. 95-31663

[51] Int. Cl.$^6$ ................................................ G08B 17/00
[52] U.S. Cl. .................... 340/588; 340/584; 340/603; 340/679; 340/626; 340/521; 340/540; 73/709; 73/4 V; 73/749; 364/557; 364/558; 364/551.01
[58] Field of Search .............................. 340/584, 603, 340/626, 521, 540, 442, 445, 679, 588; 73/709, 4 V, 749; 364/556, 557, 558, 551.01

[56] References Cited

U.S. PATENT DOCUMENTS

| | | | |
|---|---|---|---|
| 4,742,857 | 5/1988 | Gandhi | 152/418 |
| 4,893,110 | 1/1990 | Hebert | 340/442 |
| 5,228,337 | 7/1993 | Sharpe et al. | 73/146.5 |
| 5,231,872 | 8/1993 | Bowler et al. | 73/146.5 |
| 5,461,901 | 10/1995 | Ottestad | 73/4 R |
| 5,475,619 | 12/1995 | Sugano et al. | 364/558 |
| 5,481,482 | 1/1996 | Nagai et al. | 364/558 |
| 5,511,427 | 4/1996 | Burns | 73/708 |
| 5,533,074 | 7/1996 | Mansell | 376/258 |
| 5,556,476 | 9/1996 | Lei et al. | 118/728 |

*Primary Examiner*—Jeffery Hofsass
*Assistant Examiner*—Benjamin C. Lee
*Attorney, Agent, or Firm*—Jones & Volentine, L.L.P.

[57] ABSTRACT

A vacuum controlling apparatus is provided. The vacuum level of a vacuum chamber can be accurately maintained by measuring and controlling the vacuum level of the vacuum chamber by using six parameters: desired pressure, predetermined time for reaching the desired pressure, predetermined temperature, actual pressure, actual time for reaching the desired pressure, and actual temperature.

13 Claims, 2 Drawing Sheets

VACUUM APPARATUS FOR SEMICONDUCTOR DEVICE

BACKGROUND OF THE INVENTION

The present invention relates to a vacuum apparatus for a semiconductor device. More particularly, the present invention relates to a vacuum apparatus for measuring and controlling a vacuum level by using a plurality of vacuum parameters.

Vacuum apparatuses are used in processes for manufacturing various kinds of semiconductor devices. Most semiconductor devices require elaborate control mechanisms and thus it is essential that vacuum apparatuses used for fabrication of the semiconductor devices should maintain a highly reliable vacuum level. Lowered reliability may bring about a decrease of product yield for a semiconductor device and degradation of characteristics for the semiconductor device. A conventional vacuum apparatus will be described as follows.

FIG. 1 is a simplified view of a conventional vacuum apparatus. The conventional vacuum apparatus comprises a gas input controlling unit 3, a ventilating unit 5, a vacuum measuring unit 7, and a device controlling unit 9, each of which is connected to a vacuum chamber 1.

The vacuum chamber 1 maintains a vacuum level at a predetermined value. The gas input controlling unit 3 injects gas into vacuum chamber 1 and controls an injection dose. The ventilating unit 5 exhausts the injected gas from the vacuum chamber 1 when necessary. The vacuum measuring unit 7 measures the pressure in the vacuum chamber 1 by using a pressure measuring gauge (not shown) installed in vacuum chamber 1 and transmits the result of this measurement to the device controlling unit 9. The device controlling unit 9 controls the pressure of the vacuum chamber 1 on the basis of the measured pressure data transmitted from the vacuum measuring unit 7.

In this apparatus, if the pressure measuring gauge does not function properly, the vacuum measuring unit 7 obtains an inaccurate pressure value. Then, the device controlling unit 9 controls the pressure of the vacuum chamber 1 with the inaccurate data. As a result, the vacuum chamber 1 may not maintain an accurate vacuum level.

SUMMARY OF THE INVENTION

The object of the present invention is to provide a vacuum apparatus whose vacuum reliability is increased by measuring and controlling the vacuum level of a vacuum chamber, using a plurality of vacuum parameters.

To achieve the above object, there is provided a vacuum apparatus comprising: a vacuum chamber; a gas input controlling unit connected to the vacuum chamber; a ventilating unit connected to the vacuum chamber; a device controlling unit connected to a vacuum chamber; and a vacuum parameter measuring and controlling unit connected to the vacuum chamber for measuring actual values for a plurality of vacuum parameters, comparing the actual values with respective predetermined values for the plurality of vacuum parameters, and controlling the vacuum chamber according to the results of the comparison.

The vacuum parameters are pressure, time for reaching a desired pressure, and temperature. The vacuum chamber operates when the pressure is equal to the desired pressure, the actual time for reaching the desired pressure is larger than a predetermined time for reaching the desired pressure, and the actual temperature is larger than the predetermined temperature. The vacuum chamber stops operating when one of the actual time for reaching a desired pressure is smaller than the predetermined time for reaching the desired, or the actual temperature is smaller than the predetermined temperature. The vacuum parameter measuring and controlling unit preferably measures and controls the vacuum parameters by using a microcomputer.

According to the present invention, the vacuum level of the vacuum chamber can be always accurately maintained by controlling the vacuum chamber through the plurality of different vacuum parameters, even though a pressure measuring gauge does not function properly.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF A PREFERRED EMBODIMENT OF THE INVENTION

Figure 1:
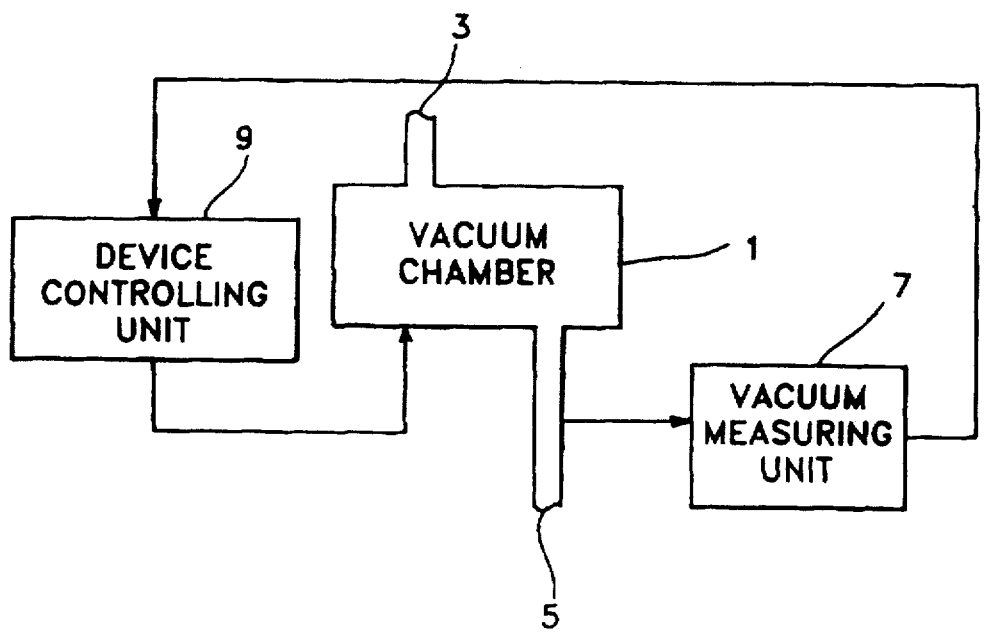
FIG. 1 is a simplified view of a conventional vacuum apparatus.
Figure 2:
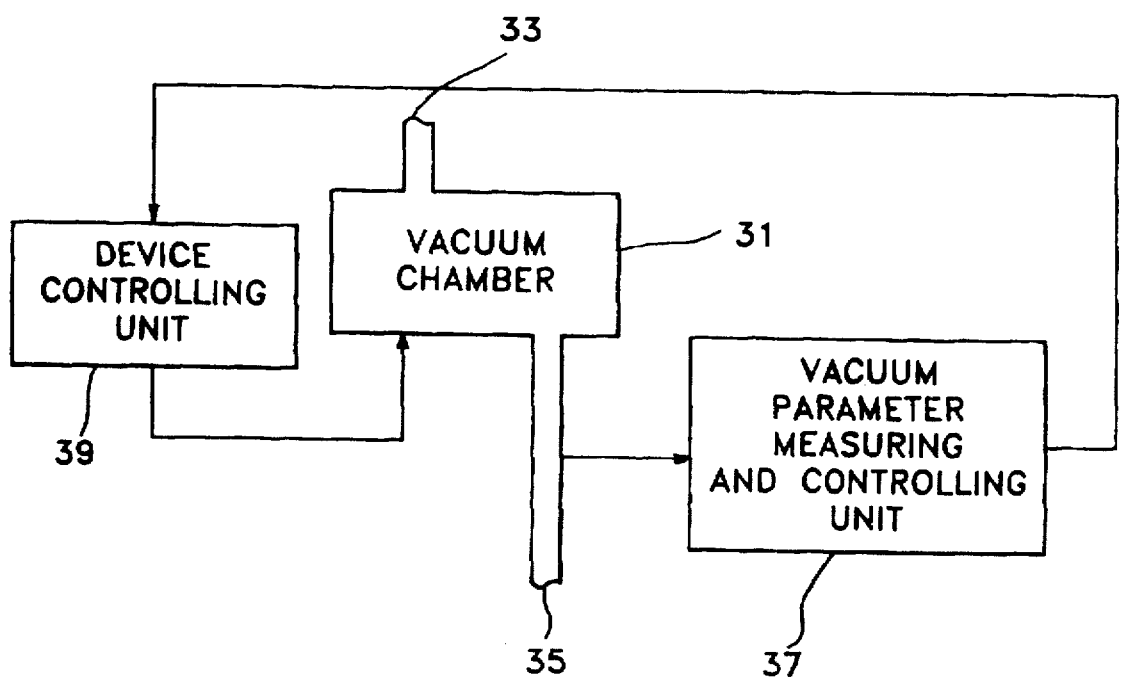
FIG. 2 is a simplified view of a vacuum apparatus according to a preferred embodiment of the present invention.

FIG. 2 is a simplified view of a vacuum apparatus according to a preferred embodiment of the present invention. The vacuum apparatus comprises a gas input controlling unit 33, a ventilating unit 35, a vacuum parameter measuring unit 37, and a device controlling unit 39 which are each connected to a vacuum chamber 31.

The vacuum chamber 31 maintains a vacuum level at a predetermined value. The gas input controlling unit 33 injects gas into vacuum chamber 31 and controls an injection dose of the gas. The ventilating unit 35 exhausts the injected gas from the vacuum chamber 31, when necessary. The device controlling unit 39 controls the pressure of vacuum chamber 31. The vacuum parameter measuring and controlling unit 37 measures three vacuum parameters: actual pressure, actual time for reaching a desired pressure, and actual temperature. The vacuum parameter measuring and controlling unit 37 then compares the measured, actual values with their respective predetermined values and controls the vacuum chamber 31 according to the result of the comparison.

Primarily, the vacuum parameter measuring and controlling unit 37 measures the actual pressure and stops the pumping activity when the actual pressure reaches the desired pressure. The predetermined values for the time to reach the desired pressure and for temperature upon reaching the desired pressure are used as a check to establish whether the desired pressure has truly been reached. These two predetermined values are important because they serve to show a minimum temperature and a minimum time to reach the desired pressure. If the vacuum parameter measuring and controlling unit 37 indicates that it has reached the desired pressure before the predetermined temperature is reached, or before the predetermined time to reach the desired pressure has elapsed, then there is likely a malfunction in the vacuum parameter measuring and controlling unit 37 and the desired pressure has not actually been achieved.

Therefore, after the vacuum parameter measuring and controlling unit 37 determines that the pressure has reached the desired value, it determines the actual temperature and the actual time for reaching the desired pressure. If the actual values of these two parameters are greater than or equal to their respective predetermined values, the vacuum chamber 31 continues operation. If they are not, the vacuum chamber 31 stops operating and preferably sounds an alarm simultaneously to warn the operator. The vacuum parameter measuring and controlling unit 37 preferably controls and compares these vacuum parameters by using a microcomputer.

Figure 3:
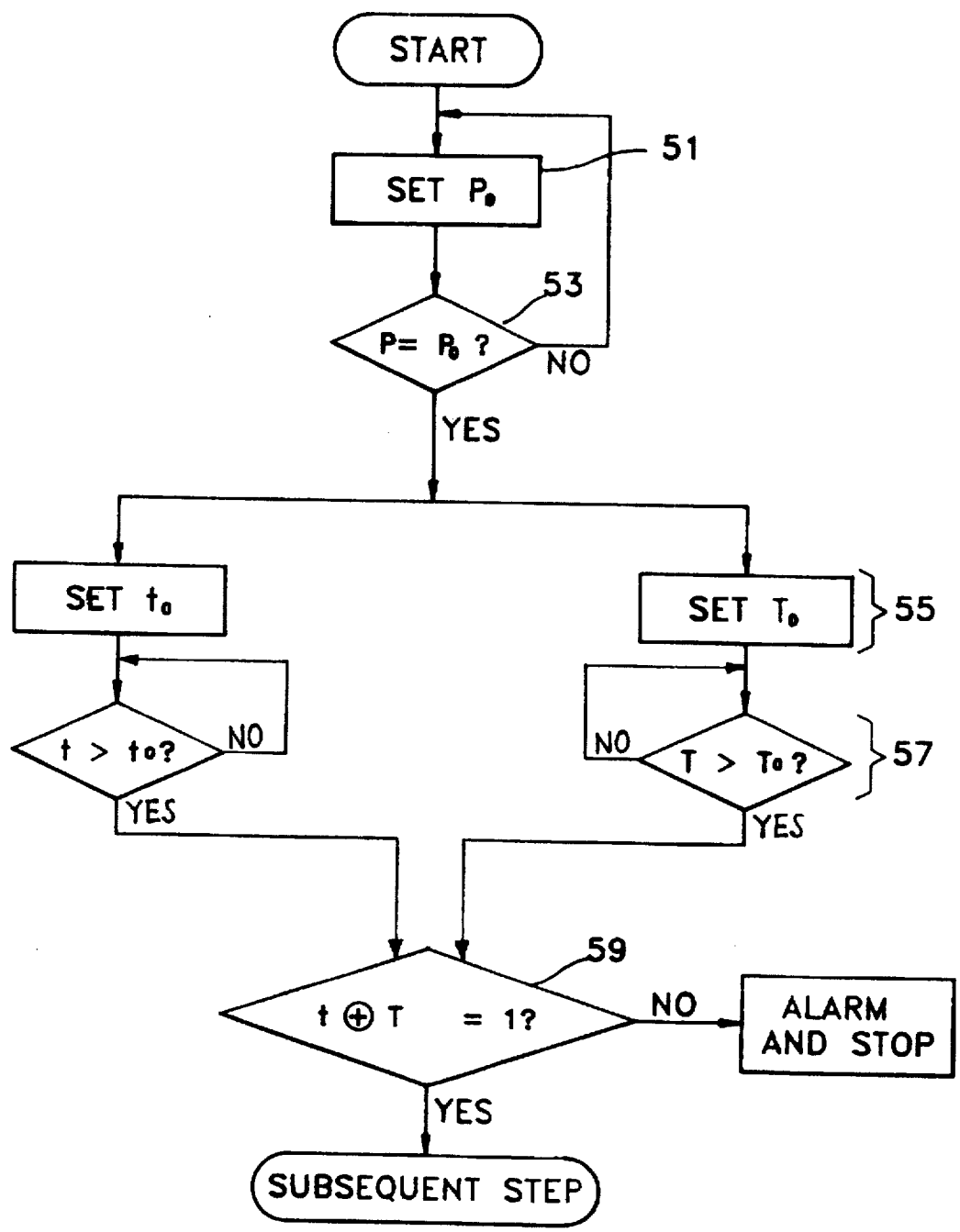
FIG. 3 is a flow-chart showing a method for controlling vacuum parameters in the vacuum apparatus shown in FIG. 2.

FIG. 3 is a flow-chart showing a method for controlling the vacuum parameters in the vacuum apparatus shown in FIG. 2. Initially, a desired pressure $P_0$ of a vacuum chamber 31 is set, as shown in step 51. Then the desired pressure $P_0$ is compared with a measured, actual value of the current pressure P in step 53. If the vacuum parameter measuring and controlling unit 37 determines that the actual pressure P of the vacuum chamber 31 is equal to the desired pressure $P_0$, then processing continues to step 55. If vacuum parameter measuring and controlling unit 37 determines that the actual pressure P differs from the desired pressure $P_0$, the procedure returns to the beginning of processing and executes step 51 again.

In step 55, a predetermined time $t_0$ for reaching the desired pressure, and a predetermined temperature $T_0$ are set. The values of the actual time t required to reach the predetermined pressure and the actual temperature T are compared with the predetermined values $t_0$ and $T_0$, in step 57. If the measured, actual values are all larger than their respective predetermined values in step 59, the procedure proceeds to a subsequent step. If they are not, an alarm (not shown) warns and the vacuum chamber 31 simultaneously stops operating. If the vacuum chamber stops operating, the vacuum level of the vacuum chamber 31 is controlled automatically or manually to make the values of both the vacuum parameters t and T larger than their respective predetermined values $t_0$ and $T_0$.

As described above, the vacuum level of the vacuum chamber 31 can be accurately maintained by using time for reaching a desired pressure, and temperature as well as pressure, as vacuum parameters, even though a disorder takes place in a pressure measuring gauge.

The present invention is not limited to the above-described embodiments. Various changes and modifications may be effected by one having an ordinary skill in the art and remain within the scope of the invention, as defined by the appended claims.

What is claimed is:

1. A vacuum apparatus, comprising:

a vacuum chamber;

a gas input controlling unit connected to the vacuum chamber;

a ventilating unit connected to the vacuum chamber;

a device controlling unit connected to a vacuum chamber; and a vacuum parameter measuring and controlling unit connected to the vacuum chamber for measuring actual values for a plurality of vacuum parameters, comparing the actual values with respective predetermined values for the plurality of vacuum parameters, and for stopping the gas input controlling unit from functioning when one of the actual values for the plurality of vacuum parameters is smaller than the respective predetermined value for the one of the plurality of vacuum parameters, wherein the plurality of vacuum parameters comprise pressure and time for reaching a desired pressure.

2. A vacuum apparatus as claimed in claim 1, wherein said vacuum parameter measuring and controlling unit measures the vacuum parameters and stops the gas input controlling unit from functioning by using a microcomputer.

3. A vacuum apparatus, comprising:

a vacuum chamber;

a gas input controlling unit connected to the vacuum chamber;

a ventilating unit connected to the vacuum chamber;

a device controlling unit connected to a vacuum chamber; and a vacuum parameter measuring and controlling unit connected to the vacuum chamber for measuring actual values for a plurality of vacuum parameters, comparing the actual values with respective predetermined values for the plurality of vacuum parameters, and controlling the gas input controlling and the ventilating unit according to the results of the comparison, wherein the plurality of vacuum parameters are pressure, time for reaching a desired pressure, and temperature.

4. A vacuum apparatus as claimed in claim 3, wherein the vacuum chamber operates when the pressure is equal to the desired pressure, the actual time for reaching the desired pressure is larger than a predetermined time for reaching the desired pressure, and the actual temperature is larger than the predetermined temperature, and the vacuum chamber stops operating when one of the actual time for reaching a desired pressure is smaller than the predetermined time for reaching the desired, or the actual temperature is smaller than the predetermined temperature.

5. A method for controlling a vacuum apparatus having a vacuum chamber, a device control unit, and a vacuum parameter measuring and controlling unit, comprising the steps of:

pumping gas out of the vacuum chamber until the vacuum parameter measuring and controlling unit determines that a desired pressure is reached;

measuring an actual time until the vacuum parameter measuring and controlling unit determines that the desired pressure is reached;

measuring an actual temperature in the vacuum chamber after the vacuum parameter measuring and controlling unit determines that the desired pressure is reached;

comparing the actual temperature with a predetermined;

comparing the actual time to reach the desired pressure with a predetermined time to reach the desired pressure;

stopping processing if the actual temperature is smaller than the predetermined temperature; and stopping processing if the actual time to reach the desired pressure is smaller than the predetermined time to reach the desired pressure.

6. The method of claim 5, further comprising the step of sounding an alarm if the actual temperature is smaller than the predetermined temperature.

7. A method for controlling a vacuum apparatus having a vacuum chamber, a device control unit, and a vacuum parameter measuring and controlling unit, comprising the steps of:

pumping gas out of the vacuum chamber until the vacuum parameter measuring and controlling unit determines that a desired pressure is reached;

measuring an actual time until the vacuum parameter measuring and controlling unit determines that the desired pressure is reached;

measuring an actual temperature in the vacuum chamber after the vacuum parameter measuring and controlling unit determines that the desired pressure is reached;

comparing the actual temperature with a predetermined temperature;

comparing the actual time to reach the desired pressure with a predetermined time to reach the desired pressure; and stopping processing if the actual time to reach the desired pressure is smaller than the predetermined time to reach the desired pressure.

8. The method of claim 7, further comprising the step of sounding an alarm if the actual time to reach the desired pressure is smaller than the predetermined time to reach the desired pressure.

9. The method of claim 8, further comprising the step of stopping processing if the actual temperature is smaller than the predetermined temperature.

10. The method of claim 9, further comprising the step of sounding an alarm if the actual temperature is smaller than the predetermined temperature.

11. A vacuum apparatus, comprising:

a vacuum chamber;

a gas input controlling unit connected to the vacuum chamber;

a ventilating unit connected to the vacuum chamber;

a device controlling unit connected to the vacuum chamber;

an alarm mechanism for indicating a malfunction; and a vacuum parameter measuring and controlling unit connected to the vacuum chamber for measuring actual values for a plurality of vacuum parameters, comparing the actual values with respective predetermined values for the plurality of vacuum parameters, for controlling the gas input controlling unit and the ventilating unit according to the result of the comparison, and for activating the alarm mechanism when one of the actual values for the plurality of vacuum parameters is smaller than the respective predetermined value for the one of the plurality of vacuum parameters, wherein the plurality of vacuum parameters comprise pressure and time for reaching a desired pressure.

12. A vacuum apparatus, comprising:

a vacuum chamber;

a gas input controlling unit connected to the vacuum chamber;

a ventilating unit connected to the vacuum chamber;

a device controlling unit connected to a vacuum chamber; and a vacuum parameter measuring and controlling unit connected to the vacuum chamber for measuring actual values for a plurality of vacuum parameters, comparing the actual values with respective predetermined values for the plurality of vacuum parameters, and for stopping the gas input controlling unit from functioning when one of the actual values for the plurality of vacuum parameters is smaller than the respective predetermined value for the one of the plurality of vacuum parameters, wherein the plurality of vacuum parameters comprise temperature and time for reaching a desired pressure.

13. A vacuum apparatus, comprising:

a vacuum chamber;

a gas input controlling unit connected to the vacuum chamber;

a ventilating unit connected to the vacuum chamber;

a device controlling unit connected to the vacuum chamber;

an alarm mechanism for indicating a malfunction; and a vacuum parameter measuring and controlling unit connected to the vacuum chamber for measuring actual values for a plurality of vacuum parameters, comparing the actual values with respective predetermined values for the plurality of vacuum parameters, for controlling the gas input controlling unit and the ventilating unit according to the result of the comparison and for activating the alarm mechanism when one of the actual values for the plurality of vacuum parameters is smaller than the respective predetermined value for the one of the plurality of vacuum parameters, wherein the plurality of vacuum parameters comprise temperature and time for reaching a desired pressure.

* * * * *